US006987379B2

(12) United States Patent
Peron

(10) Patent No.: US 6,987,379 B2
(45) Date of Patent: Jan. 17, 2006

(54) AUXILIARY SWITCHING CIRCUIT FOR A CHOPPING CONVERTER

(75) Inventor: Benoît Peron, Tours (FR)

(73) Assignee: STMicroelectronics S.A., Montrouge (FR)

( * ) Notice: Subject to any disclaimer, the term of this patent is extended or adjusted under 35 U.S.C. 154(b) by 9 days.

(21) Appl. No.: 10/469,629

(22) PCT Filed: Mar. 8, 2002

(86) PCT No.: PCT/FR02/00842

§ 371 (c)(1),
(2), (4) Date: Jan. 13, 2004

(87) PCT Pub. No.: WO02/073783

PCT Pub. Date: Sep. 19, 2002

(65) Prior Publication Data

US 2004/0113596 A1    Jun. 17, 2004

(30) Foreign Application Priority Data

Mar. 9, 2001 (FR) .................................. 01 03266

(51) Int. Cl.
G05F 1/613 (2006.01)
(52) U.S. Cl. ...................... 323/225; 323/259; 323/262
(58) Field of Classification Search ............... 323/222, 323/225, 255, 259, 262, 282, 284, 288, 290; 363/56.12, 136
See application file for complete search history.

(56) References Cited

U.S. PATENT DOCUMENTS

| 4,386,396 | A | * | 5/1983 | Angquist ..................... 363/136 |
| 5,260,607 | A | * | 11/1993 | Kinbara ................... 363/56.12 |
| 5,636,114 | A | | 6/1997 | Bhagwat et al. |
| 5,909,107 | A | | 6/1999 | Aonuma et al. |
| 6,051,961 | A | * | 4/2000 | Jang et al. ................... 323/225 |

FOREIGN PATENT DOCUMENTS

EP     0 910 158 A1    8/1998

OTHER PUBLICATIONS

International Search Report from the corresponding International Application PCT/FR02/00842, filed Mar. 8, 2002.
Mantov G. et al., Diode Recovery Current Suppression Circuit, Intelec 2000, 22$^{nd}$ International Telecommunications Energy Conference, Phoenix, AZ Sep. 10-14, 2000, Intelec. International Telecommunications Energy Conference, New York, NY, IEEE, US, vol. conf. 22, Sep. 10, 2000, pp. 1250129, XP000968711.
Patent Abstracts of Japan, vol. 1998, No. 2, Jan. 30, 1998 & JP 09 266665 A (NEC Corp), Oct. 7, 1997.

* cited by examiner

Primary Examiner—Jessica Han
(74) Attorney, Agent, or Firm—Lisa K. Jorgenson; James H. Morris; Wolf, Greenfield & Sacks, P.C.

(57) ABSTRACT

The invention relates to an auxiliary switching circuit (10) for a chopping converter comprising a first inductive element (L0) for serial energy storage with a free-wheel diode (DL) and a switch (K), in addition to a second inductive element (L) for di/dt control when the switch is closed, the auxiliary switching circuit comprising a magnetic circuit (11) whereby a main winding thereof is formed at least partially by the first inductive element (L0), also comprising means (L1, D1, L2, D2) for discharging the second inductive element when the switch is opened or closed, and means (L2, D2) for transferring the energy corresponding to the closure vis a vis said main winding.

10 Claims, 5 Drawing Sheets

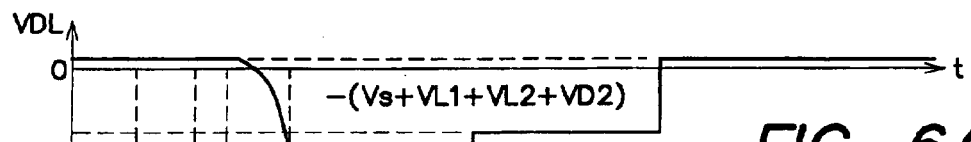
FIG. 6A
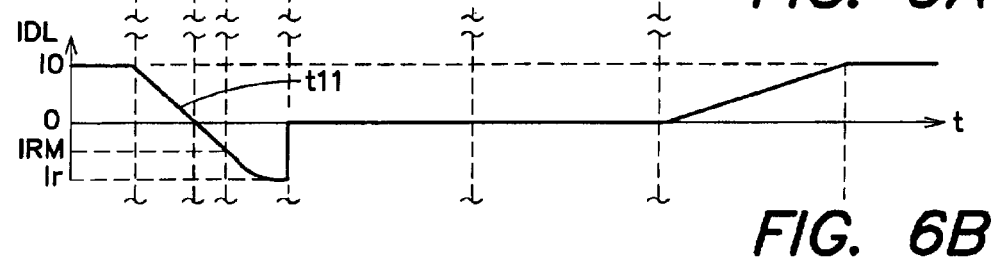
FIG. 6B
FIG. 6C
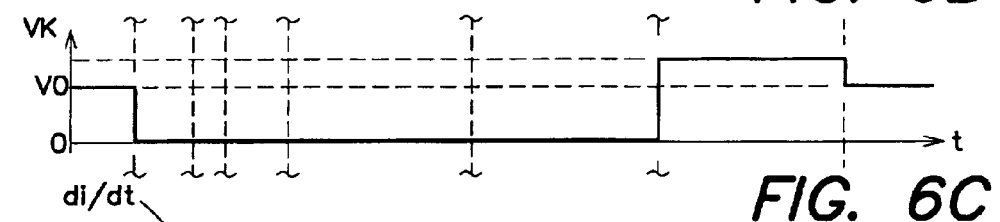
FIG. 6D
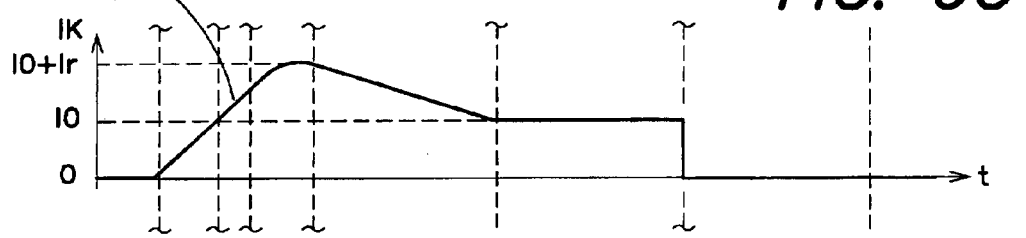
FIG. 6E
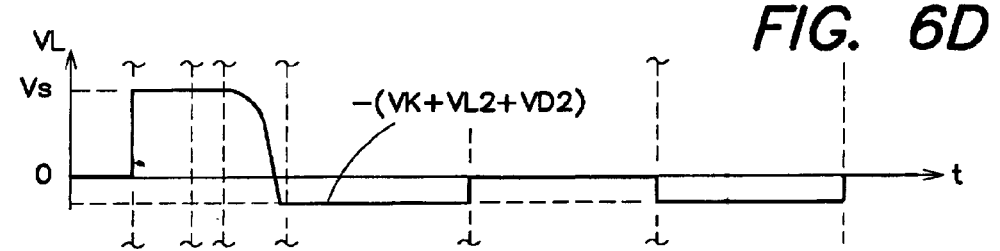
FIG. 6F
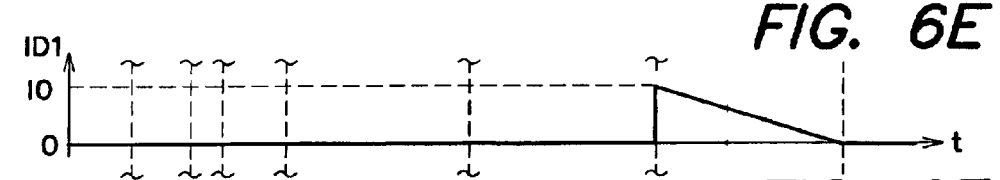
FIG. 6G
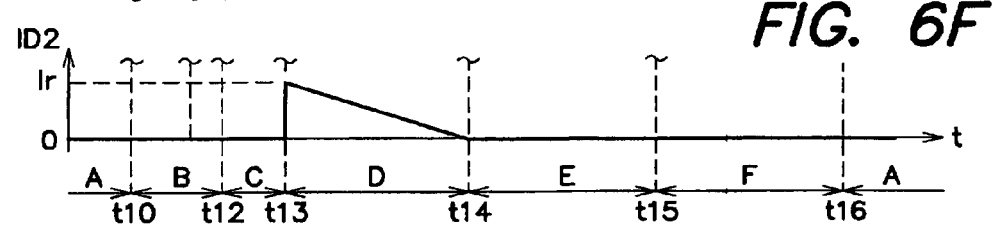

# US 6,987,379 B2

AUXILIARY SWITCHING CIRCUIT FOR A CHOPPING CONVERTER

BACKGROUND OF THE INVENTION

1. Field of the Invention

The present invention relates to the field of power converters of switched-mode type. Such converters use an inductive element, associated with a power switch and with a free wheel diode, to perform a power conversion and a correction of the power factor, generally based on a D.C. input voltage. Voltage step-down converters (BUCK), voltage step-up converters (BOOST), and buck-boost converters are known.

The present invention more specifically relates to a circuit for helping the switching of the power switch of a switched-mode converter.

2. Discussion of the Related Art

FIG. 1 shows the simplified diagram of a conventional step-up converter 1. Such a converter includes an inductance L0 in series with a free wheel diode DL between two positive input and output terminals 2 and 3 of the converter, the cathode of diode DL being connected to terminal 3. A power switch K connects the midpoint 4 of this series connection to a terminal 5 of application of a negative or reference voltage (generally, the ground) common to the converter input and output. A D.C. supply voltage source 6 provides a voltage $V_E$ across terminals 2 and 5. On the output side, a storage capacitor C0 generally connects terminals 3 and 5 and provides a voltage $V_S$ to a load Q. Load Q has been shown in FIG. 1 by dotted lines integrating capacitor C0, which may or may not belong to the load. Switch K is controlled by a circuit 7 (CTRL), for example, in pulse-width modulation (PWM).

The operation of a step-up converter will now be described. When switch K is on, power is stored in inductance L0 and load Q is supplied by the power stored in capacitor C0. When switch K is off, inductance L0 gives back the stored power to capacitor C0 via free wheel diode DL.

FIG. 2 shows the simplified electric diagram of a step-down converter 1'. It shows the same components as in FIG. 1. However, here, switch K is connected in series with inductance L0 between positive input and output terminals 2 and 3. Free wheel diode DL grounds the junction point 4' of switch K and inductance L0, its cathode being connected to point 4'. Switch K may also be provided between the negative terminal of source 6 and the anode of diode DL.

The operating principle is the same. Power is stored in inductance L0 during the on periods of switch K. During periods when switch K is off, this power is given back to capacitor C0, free wheel diode DL being used to loop back the circuit.

A problem which arises with switched-mode converters, also called hard-switching converters, in which the current and the voltage cross each other upon each switching, is linked to the switch turning-on.

Indeed, upon each turning-on of switch K, free wheel diode DL must block. Now, at the blocking of a diode, especially of a PN junction diode, a recovered charge phenomenon occurs.

This phenomenon is illustrated by FIGS. 3A to 3C, which show, in relation with the circuit of FIG. 1, an example of the shape of current $I_{DL}$ in the free wheel diode, of output voltage $V_S$ and of current $I_T$ in switch K.

Switch K is initially assumed to be off. Accordingly, a current $I_{Lf}$ flows through diode DL. This current corresponds to the power given back by inductance L0. The output voltage is at a level V0. As for switch K, the current $I_T$ flowing therethrough is null.

It is assumed that at a time t1, control circuit 7 turns switch K on. During the switching, current $I_L$ in the inductance, which corresponds to the sum of currents $I_{DL}$ and $I_T$ is a constant. Accordingly, the current which, during the switching, increases in the switch, translates as a decrease with an inverse slope of the current in diode DL.

At a time t2, the current in diode DL becomes zero and the current in the switch reaches level $I_{Lf}$. At this time starts the recovered charge phenomenon of diode DL. This known phenomenon translates as an inversion of the current through the diode to reach a level $I_{RM}$ corresponding to the maximum recovery current of the diode. Current $I_{RM}$ is reached at a time t3 from which the current through the diode tends towards zero again, reaching it at a time t4. Since the current in inductance L0 is, during the switching, substantially constant, the negative current peak on the diode side translates as an overcurrent in switch K, the maximum value of which corresponds to current $I_{Lf}$ plus value $I_{RM}$. On the side of voltage $V_S$, the voltage decrease in practice intervenes from time t3, that is, from the inversion of the current slope in diode DL. In other words, the voltage across the diode is zero between times t2 and t3 corresponding to the first recovery phase ta. It can be considered that the diode then transiently conducts in reverse. Between times t3 and t4 (second recovery phase tb), voltage $V_S$ decreases from $V_0$ to a zero voltage. The voltage provided to capacitor C0 is here considered. Indeed, the presence of the capacitor in practice results in output voltage $V_S$ remaining approximately stable.

The slope between times t1 and t3 of the current decrease in diode DL depends on the turn-on speed of the switch and thus on its di/dt at the turning-on. The higher this di/dt, which favors an abrupt switching, the higher amplitude $I_{RM}$ is for a PN-junction diode. However, the smaller di/dt, the longer the recovery time at the blocking (trr=t4−t2).

The losses in a diode according to the di/dt value have a parabolic shape. There is an optimal point where the surface area of the current shape between times t2 and t4 is minimum, which results in minimum losses of recovered charges in the diode.

For switch K, the recovered charge phenomenon of the diode is particularly disturbing. Indeed, for a step-up converter, the switch then sees across its terminals, between times t2 and t3, output voltage $V_S$. In the case of a step-down converter, the voltage seen by the switch across its terminals corresponds to the voltage of generator 6. In all cases, it is the highest voltage between voltages $V_E$ and $V_S$.

High losses can then be observed in switch K. In FIGS. 3A to 3C, the loss periods have been symbolized by hatching on the various timing diagrams.

In practice, the losses in switch K (generally, a power transistor) at its turning-on (times t1 to t4) form most of the switching losses of the converter. In particular, the losses due to the actual blocking of the diode and the turn-off losses of the switch are negligible with respect to the losses generated at its turning-on.

A first solution to reduce this disadvantage consists of using diodes with no recovered charges, for example, Schottky or SIC-type diodes.

A first disadvantage of this solution is that diodes with no recovered charges are often limited to a breakdown voltage of some hundred volts. This solution is thus not applicable to converters operating under voltages of several hundreds of volts, which is in practice current in power electronics. Several diodes in series must then be provided to increase the breakdown voltage.

Another disadvantage of this solution is that, even if it decreases losses linked to recovered charges (times t2 to t4), the most significant losses linked to the sole switch turning-on are not avoided. Referring to the example of FIGS. 3A to 3C, the use of a diode with no recovered charges results in an zero voltage $V_S$ from time t2. There thus remain the losses linked to the surface areas located between times t1 and t2.

Another disadvantage of diodes with no recovered charges is that they are particularly expensive as compared to PN diodes. Presently, the cost ratio is greater than 20.

A second solution to attempt solving recovered charge problems is to provide a circuit for helping the switching of the power switch of the converter.

FIG. 4 shows a conventional example of such an aid circuit, applied to a step-up converter such as shown in FIG. 1. FIG. 4 shows all elements of FIG. 1, to which is added a circuit 8 for helping the switching of switch K. This circuit is formed of an inductance L, associated in parallel with a resistor R and a diode D, between point 4 and switch K. The function of inductance L is to control the switch di/dt. By decreasing this di/dt value, amplitude $I_{RM}$ is decreased.

A problem which arises is that resistor R must be provided to dissipate a reverse overvoltage in inductance L. Indeed, upon the turn-on switching of switch K, the voltage across inductance L takes the value of output voltage $V_S$. The same losses occur at the transistor turning-off. These are resistive losses which are all the greater as the di/dt value is high. In other conventional examples, dissipation element R is replaced with a capacitor, a zener diode, etc.

Thus, this second solution has the same disadvantages as the use of a diode with no recovered charges.

A third known solution (not shown) consists of a circuit for helping the switching using the transient switching resonance. Such a circuit uses, like the circuit of FIG. 4, an additional inductance. However, to avoid resistive loss problems, a second switch, the control of which is desynchronized with respect to that of switch K, is used.

An example of a switching aid circuit of this type is described in paper "An overview of soft switching technics for PWM convertors" by G. Hua and F. Lee, published in EPE Journal, Vol. 3, March 1993.

Such a solution provides satisfactory results, but has a particularly complex and expensive implementation. In particular, a control system desynchronized from the used switches must be provided. Further, as compared to the circuit of FIG. 4, it is necessary to have an additional power switch, two additional diodes and, above all, a high-voltage capacitor.

The present invention aims at overcoming the disadvantages of known switching aid circuits.

SUMMARY OF THE INVENTION

The present invention more specifically aims at providing a switching aid circuit which reduces losses due to the turning-on of a power switch.

The present invention also aims at providing a solution requiring no additional switch in a lightly dissipative circuit.

The present invention also aims at providing a particularly simple and inexpensive solution.

The present invention also aims at providing a solution which is compatible with the use of diodes with recovered charges (PN diodes).

The present invention also aims at preserving the control of the di/dt value upon turning-on of the power transistor.

To achieve these objects, the present invention provides a circuit for helping the switching of a switched-mode converter, which includes a first inductive power storage element in series with a free wheel diode and a switch, and a second inductive element for controlling the di/dt value upon turning-on of the switch, including:

a magnetic circuit having a main winding formed, at least partially, by the first inductive element;

means for discharging the second inductive element at the switch turning-off and turning-on; and means for transferring the power corresponding to the turning-on to said main winding.

According to an embodiment of the present invention, said discharge means include:

a first circuit including a first switching diode; and a second circuit including a first secondary winding of the magnetic circuit.

According to an embodiment of the present invention, said transfer means include the first secondary winding of the magnetic circuit and a second switching diode.

According to an embodiment of the present invention, the second discharge circuit includes the second inductive element in series with the first secondary winding, the second switching diode, and the switch.

According to an embodiment of the present invention, the switching aid circuit further includes a second secondary winding of the magnetic circuit in series with the free wheel diode.

According to an embodiment of the present invention, the secondary windings have a same number of turns.

According to an embodiment of the present invention, the number of turns of the main winding is greater than the numbers of turns of the secondary windings.

The present invention also provides a switched-mode converter of the type including a first inductive power storage element in series with a free wheel diode and a storage element of capacitive type, and a second inductive element for controlling the di/dt value upon turning-on of a switch for cutting-off a supply voltage, including a switching aid circuit.

According to an embodiment of the present invention, the converter is of voltage step-up type, the first inductive element forming the main winding of the magnetic circuit being in series with the second inductive element and the switch between two terminals of application of the supply voltage.

According to an embodiment of the present invention, the converter is of voltage step-down type, the switch being in series with, among other, the second inductive element and the free wheel diode, between two terminals of application of the supply voltage.

The foregoing objects, features and advantages of the present invention will be discussed in detail in the following non-limiting description of specific embodiments in connection with the accompanying drawings, in which:

BRIEF DESCRIPTION OF THE DRAWINGS

FIGS. 6A, 6B, 6C, 6D, 6E, 6F, and 6G illustrate, in the form of timing diagrams, the operation of the circuit of FIG. 5;

DETAILED DESCRIPTION

Figure 1:
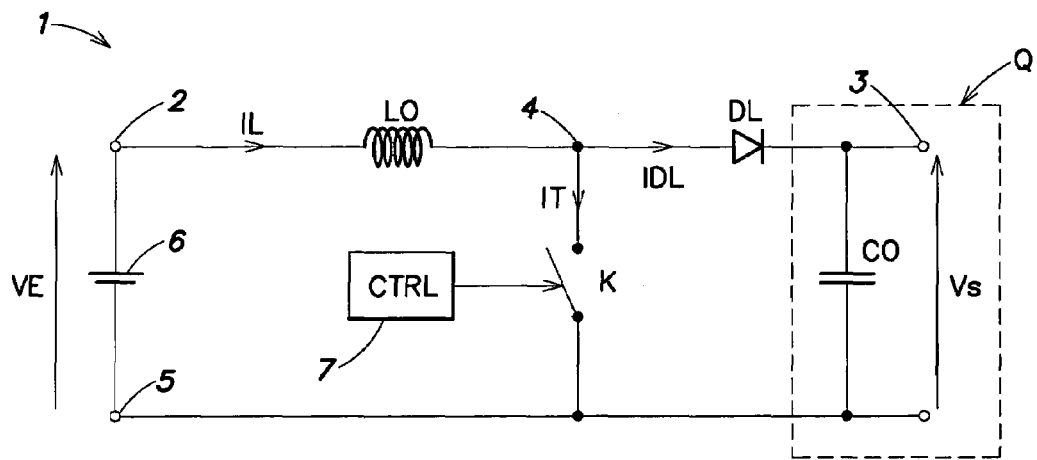
FIG. 1, previously described, shows a conventional example of a voltage step-up switched-mode converter.

The same elements have been designated with the same references in the different drawings. For clarity, only those components which are necessary to the understanding of the present invention have been shown in the drawings and will be described hereafter. In particular, the structure of the power switch control circuit has not been detailed and is not part of the present invention, its implementation being within the abilities of those skilled in the art based on the functional indications given in the present description.

A feature of the present invention is to provide a magnetic circuit for organizing the discharge of an inductance for controlling the di/dt value, especially, upon closing of the power switch of a switched-mode converter.

Another feature of the present invention is to use this magnetic circuit to temporarily store the power generally lost upon switching of the power switch and for storing this power in the converter to the benefit of the load.

Another feature of the present invention is to use the inductive element of the circuit for correcting the power factor of the switched-mode converter as an element of the magnetic circuit.

Figure 5:
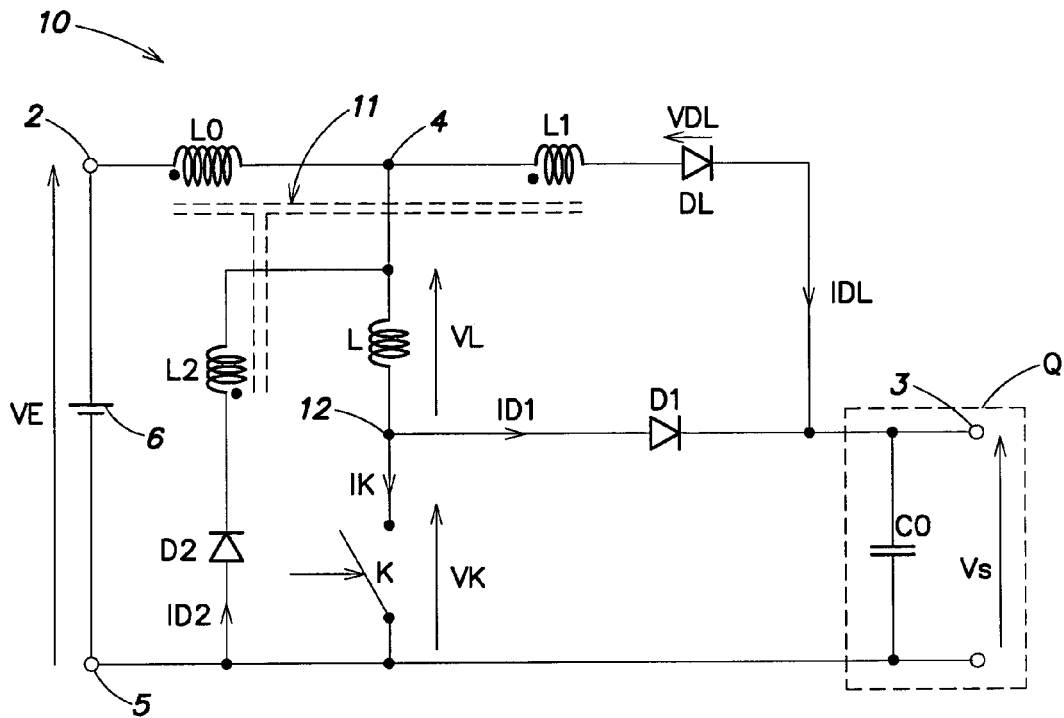
FIG. 5 shows an embodiment of a switching aid circuit according to the present invention applied to a voltage step-up converter.

FIG. 5 shows the electric diagram of a first embodiment of a voltage step-up switched-mode converter, equipped with a switching aid circuit according to the present invention.

As previously, power converter 10 includes a switch K controlled by a circuit (not shown), for example, a pulse-width modulation control circuit (PWM). A power storage inductance L0 is connected, by a first terminal, to a positive terminal 2 of application of an input voltage $V_E$ provided by a source 6 (for example, a D.C. source). Switch K is in series with an inductance L for controlling the di/dt value, connected to the second terminal 4 of inductance L0. The other terminal of switch K is connected to a reference terminal 5 (generally, the ground). Conventionally still, a free wheel diode DL is placed between point 4 and a positive output terminal 3 of the converter. This positive terminal is connected to a first electrode of a storage capacitor C0 (which may belong to the load Q to be supplied) across which is present output voltage $V_S$. The other terminal of capacitor C0 is grounded and the anode of diode DL is on the side of terminal 3.

According to the present invention, inductance L0 belongs to a magnetic circuit 11, of which it forms the main winding. Magnetic circuit 11 includes two secondary windings L1 and L2 having respective numbers of spirals or turns N1 and N2 smaller than number N0 of spirals of inductance L0. A first winding L1 of magnetic circuit 11 is connected in series with diode DL across terminals 3 and 4. In the example of FIG. 5, this inductance has been shown between point 4 and the anode of diode DL. It may also be placed between the cathode of diode DL and terminal 3, the anode of diode DL being then directly connected to point 4. A second winding L2 connects point 4 to terminal 5 by being associated in series with a diode D2, the anode of diode D2 being directed towards ground 5. As for inductance L1 and diode D1, diode D2 may be, conversely to what has been shown, connected to point 4. Finally, a diode D1 connects point 12 to terminal 3 between inductance L and switch K, the cathode of diode D1 being connected to point 12.

The function of winding L1 is, upon turning-off of switch K, to impose a negative voltage across inductance L, to enable it transfer the power that it contains to capacitor C0. Diode D1 is then forward biased.

Winding L2 has the function, upon turning-on of switch K, of imposing a negative voltage across inductance L, to transfer the power that it contains into winding L2 of the magnetic circuit. This power is recovered by winding L0 which gives it back to capacitor C0 at the next switch turning-off.

To respect these functionalities, the respective phase points of the windings are chosen as follows. Assuming that the phase point of winding L0 is connected to terminal 2 as illustrated in FIG. 5, the phase point of winding L1 must be on the side of point 4 and the phase point of winding L2 must be on the side of ground 5. Conversely, if the phase point of winding L0 is connected to point 4, the phase point of winding L1 must be on the side of terminal 3 and the phase point of winding L2 must be on the side of point 4.

The operation of the switching aid circuit shown in FIG. 5 will be described hereafter in relation with FIGS. 6A to 6G and 7A to 7F. FIGS. 6A to 6G show, in the form of timing diagrams with no scale consideration, an example of a switching cycle of switch K. FIGS. 7A to 7F show the equivalent electric diagrams of the circuit of FIG. 5 in the different switching phases.

FIG. 6A shows voltage $V_{DL}$ across free wheel diode DL. FIG. 6B shows current $I_{DL}$ in diode DL. FIG. 6C shows voltage $V_K$ across switch 4. FIG. 6D shows current $I_K$ in the switch. FIG. 6E shows voltage $V_L$ across di/dt-control inductance L. FIG. 6F shows current $I_{D1}$ in diode D1. FIG. 6G shows current $I_{D2}$ in diode D2. The signs of the currents and voltages shown in FIGS. 6A to 6G are taken in relation with the directions indicated in FIG. 5. In FIGS. 7A to 7F, the current flows have been symbolized by arrows.

Figure 7A:
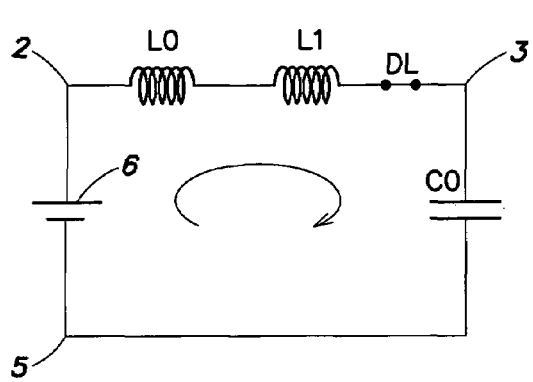
FIGS. 7A, 7B, 7C, 7D, 7E, and 7F show the equivalent electric diagrams of the circuit of FIG. 5 at the different switching phases.

It is assumed that before a time t10, switch K is off, the converter then being in free wheel (phase A). During this free wheel period, a current $I_0$ assumed to be constant flows through diode DL, being given back by inductances L0 and L1. During this phase A where switch K is off, the equivalent diagram of the converter (FIG. 7A) only includes inductance L0 in series with inductance L1 and diode DL between terminals 2 and 3 to provide the power to the load and to capacitor C0. In FIG. 7A, forward-biased diode DL has been symbolized by a short-circuit. Voltage $V_{DL}$ across this diode is slightly positive and corresponds to the voltage drop in the forward PN junction (on the order of 0.7 V). Switch K sees across its terminals a voltage $V_0$ corresponding to voltage $V_S$ plus voltage $V_{DL}$ and decreased by the voltage drop in winding L1. Voltage $V_L$ in inductance L is indeed zero during this period, as will be seen hereafter in relation with the end of the timing diagrams. Diodes D1 and D2 are blocked and the currents flowing therethrough are accordingly null. Current $I_K$ in off switch K is of course null.

Figure 7B:
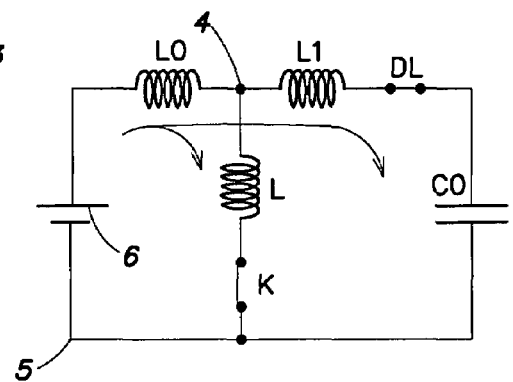

At time t10, the turning-on of switch K is controlled. This thus starts a turn-on beginning phase B, the equivalent diagram of which is shown in FIG. 7B. As compared to FIG.

7A, the only difference is that inductance L in series with on switch K (short-circuit) is interposed between point 4 and ground 5. The di/dt value upon turning-on of switch K essentially depends on inductance L. Indeed, this di/dt value depends on voltage $V_S$, on voltage $V_E$, on the mutual inductance of the magnetic circuit and on the off-load inductances L11 and L22 of the transformer formed by primary winding L0, and secondary windings L1 and L2. Due to the chosen spiral ratio, value L11 is very large as compared to value L22. The mutual inductance is moreover small as compared to value L11. As a result, slope (di/dt) is, as a first approximation, equal to $V_S/L$. Current $I_{DL}$ through diode DL thus decreases with this slope until a time t12. Since a PN junction is used, the diode exhibits a recovered charge area. Accordingly, current $I_{DL}$ annuls at a time t11, intermediary between times t10 and t12. Time t11 corresponds to the time when the current in switch K reaches value $I_0$. Between times t10 and t12, diodes D1 and D2 remain blocked. Voltage $V_L$ across inductance L becomes approximately equal to voltage $V_S$.

Figure 7C:
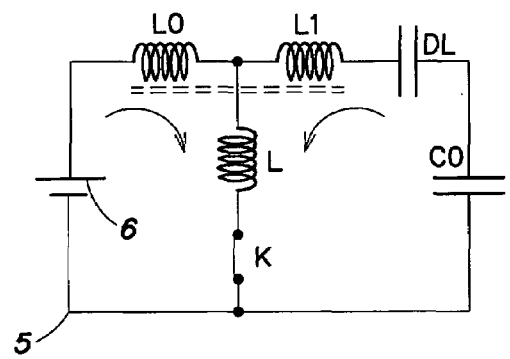

At time t12, the current through diode DL reaches value $I_{RM}$ corresponding to the maximum recovered charges. From time t12, the charges recovered by diode DL decrease. Diode DL then behaves as a capacitor. The equivalent diagram of this operating phase C is shown in FIG. 7C where diode DL has been symbolized in the form of a capacitor. The rest of the elements are the same as in FIG. 7B. Since the number of spirals of inductance L1 is small as compared to the number of spirals of inductance L0, voltage $V_{L1}$ thereacross is small. As a result, the capacitance formed by diode DL charges negatively. This phenomenon is illustrated in FIG. 6B by a pursuit of the decrease of current $I_{DL}$ until a time t13 in the form of a capacitor charge. The current decreases to a current $I_r$ conditioned by inductance L2. Indeed, voltage $V_L$, which decreases during this phase C, becomes negative until diode D2 is turned on when voltage $V_L$ becomes sufficiently negative (time t13). As for diode DL, voltage $V_{DL}$ reaches, at time t13, value $-(V_S+V_{L1}+V_{L2}+V_{D2})$. Voltage $V_L$ reaches, at time t13, value $-(V_K+V_{L2}+V_{D2})$.

Figure 7D:
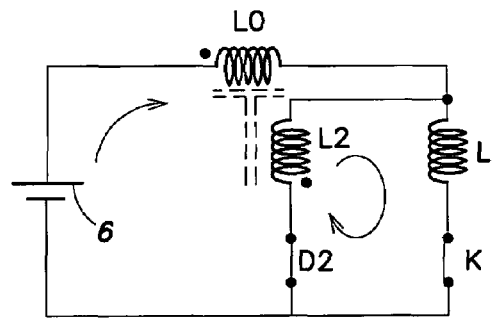

At time t13 when diode D2 turns on, current $I_{DL}$ through diode DL abruptly stops and the corresponding current is injected back into inductance L2. The excess current ($I_r$) gives the maximum amplitude of the current in inductance L2. This current depends on the numbers of spirals N0 and N2 of inductances L0 and L2. From time t13, diode D2 conducts (phase D). The equivalent diagram is illustrated in FIG. 7D. Since diode DL is blocked (non-conducting), capacitor C0 is disconnected. The magnetic circuit is, during phase D, dissociated from load Q. Diode D2 is then used as a free wheel element to transfer the power stored by inductance L into the magnetic circuit via winding L2. The voltages across diode DL and inductance L remain unchanged. Similarly, switch K being on, the voltage thereacross is zero. Diode D1 is blocked. When the current is entirely transferred into the magnetic circuit by inductance L2, the current therein goes to zero (time t14), which causes a natural blocking of diode D2, that is, with a small di/dt. Winding L2 enables decreasing of the current in switch K by transferring the power to the magnetic circuit which will give it back through inductance L0. Between times t13 and t14, the current in switch K will decrease from level $I_0+I_r$ to level $I_0$.

At time t14, the voltage across inductance L goes to zero, all the power that it contained having been transferred to the magnetic circuit. The voltage across diode DL slightly rises back while remaining negative and takes a value $-(V_S+V_{L1})$ $+V_L+V_K$. It should be reminded that voltages $V_L$ and $V_K$ are negligible (considered as null) with respect to voltages $V_S$ and $V_{L1}$.

Figure 7E:
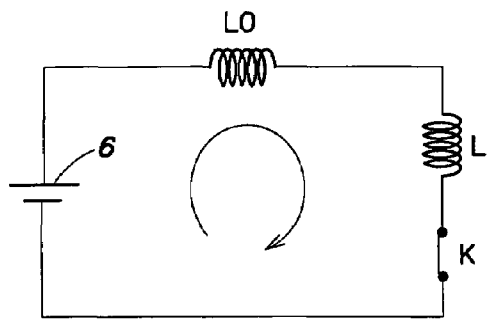

Time t14 is the beginning of a phase E where the switch is on and where the switching is over. The equivalent diagram is shown in FIG. 7E. It only includes source 6, inductances L0 and L, and switch K. Current $I_K$ is stable at level $I_0$, as well as voltage $V_{DL}$, the free wheel diode being blocked. The voltage across switch K of course is zero, as well as the voltage across inductance L and the currents in diodes D1 and D2. During phase E, inductance L0 is loaded through inductance L and switch K.

Figure 7F:
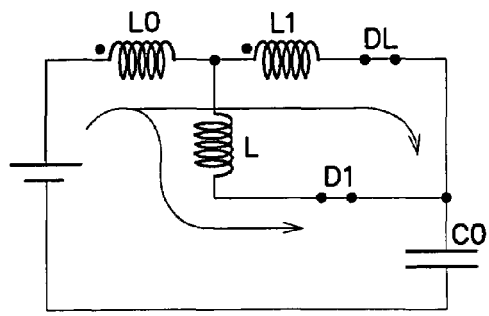

At a time t15 when switch K is turned off, a negative voltage is imposed across inductance L, due to the presence of winding L1. It should be noted that, in this case, it is not necessary to control the di/dt value upon turning-off of the transistor (conventionally). The current abruptly stops in switch K. The inversion of the voltage across inductance L1 causes the discharge, through diode D1, of the power stored during phase E in inductance L. At time t15, current $I_{D1}$ thus abruptly takes value $I_0$ and this current decreases to reach value zero at a time t16. The decrease slope of current $I_{D1}$ is a function of the value of inductance L and approximately corresponds to $V_{L1}/L$. The current through inductance L goes to zero at time t16 and all the current accumulated in winding L0 then flows through winding L1 and diode DL. The equivalent diagram of phase F is illustrated in FIG. 7F. It should be noted that diodes DL and D1 are on at the same time, but the current through diode DL starts from zero at time t15.

Time t16 starts a new phase A where the switch is off.

An advantage of the present invention is that it enables recovering the losses due to the turn-on switching of the power switch to inject them back into the load by means of the magnetic circuit. The reinjection of the current into the converter, during turn-on switching phase D of the switch, enables decreasing the duty cycle. The controller (control circuit of switch K) generally automatically decreases this duty cycle by a regulation means which is not part of the present invention. A significant improvement of the converter efficiency is thus here obtained.

Figure 4:
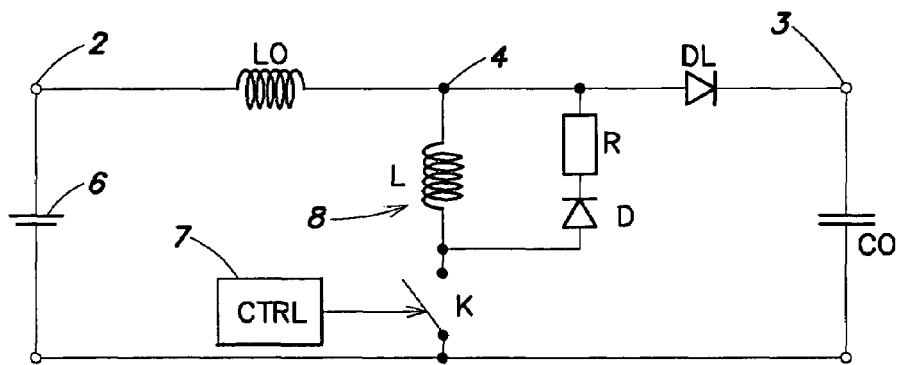
FIG. 4, previously described, shows another conventional example of a voltage step-up switched-mode converter.
Figure 3A:
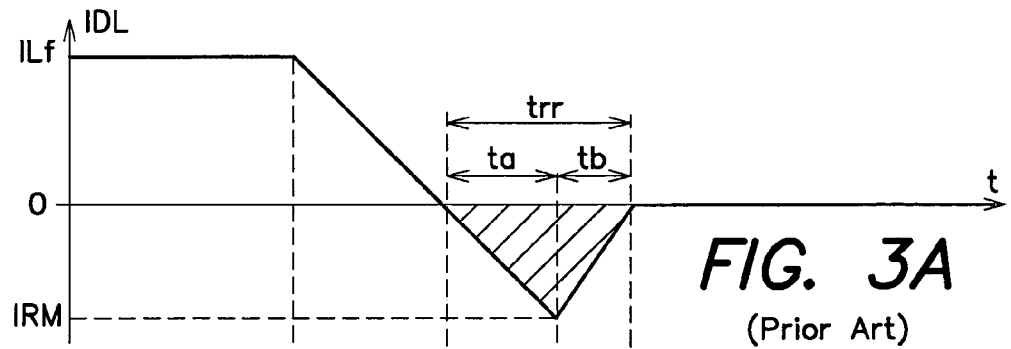
FIGS. 3A, 3B, and 3C, previously described, illustrate in the form of timing diagrams a problem posed by the circuits of FIGS. 1 and 2.
Figure 3B:
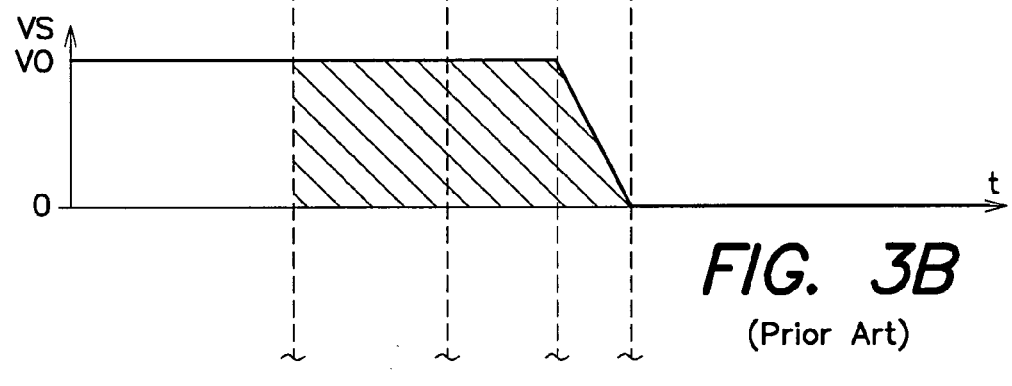
Figure 3C:
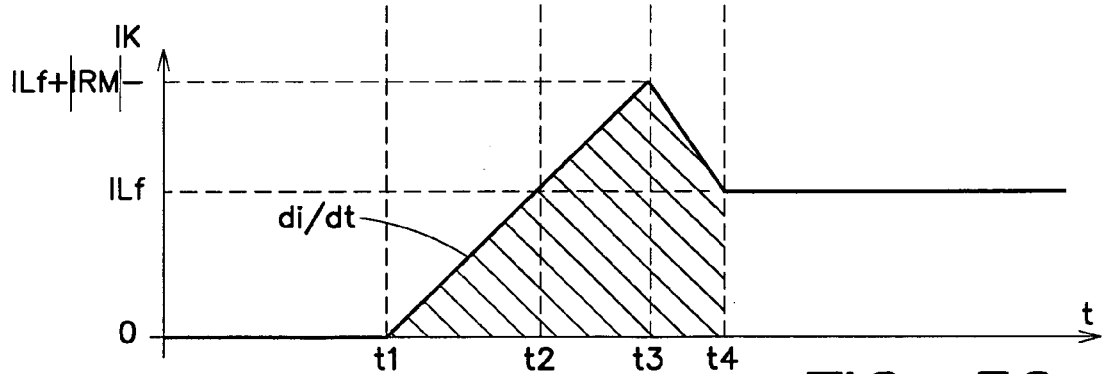

Another advantage of the present invention is that the provided solution is particularly simple. As compared to the conventional circuit of FIG. 4, one power switch and, above all, a complex control circuit, are spared.

Another advantage of the present invention is that it requires no modification of the power switch control circuit, provided that said circuit performs (which is generally the case) a regulation. The implementation of the present invention requires adding one magnetic circuit L0, L1, L2, which can be obtained by means of a single three-winding inductance. Such a magnetic circuit is considerably less expensive than the required complexity of the control circuit of FIG. 4 and than a diode with no recovered charges. On this regard, it should be noted that the solution of a diode with no recovered charges does not enable recovering the losses in the switch.

Figure 2:
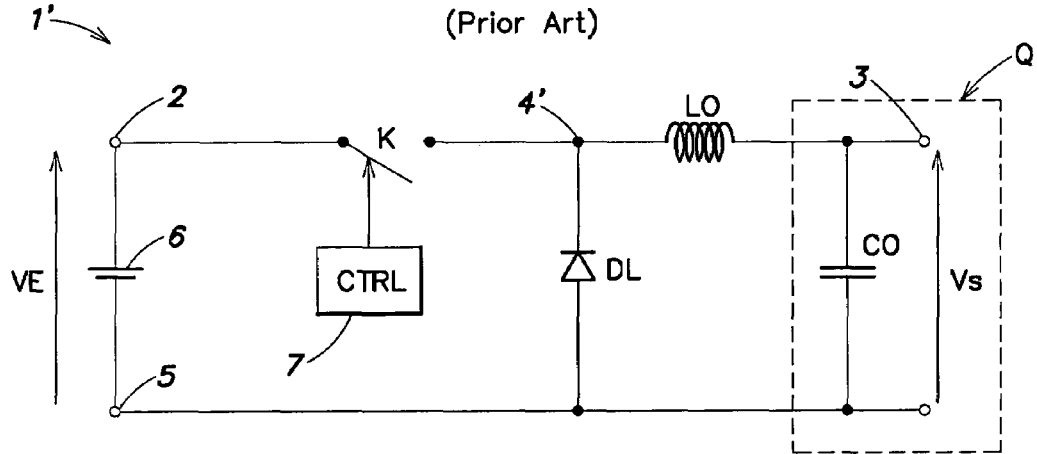
FIG. 2, previously described, shows a conventional example of a voltage step-down switched-mode converter.
Figure 8:
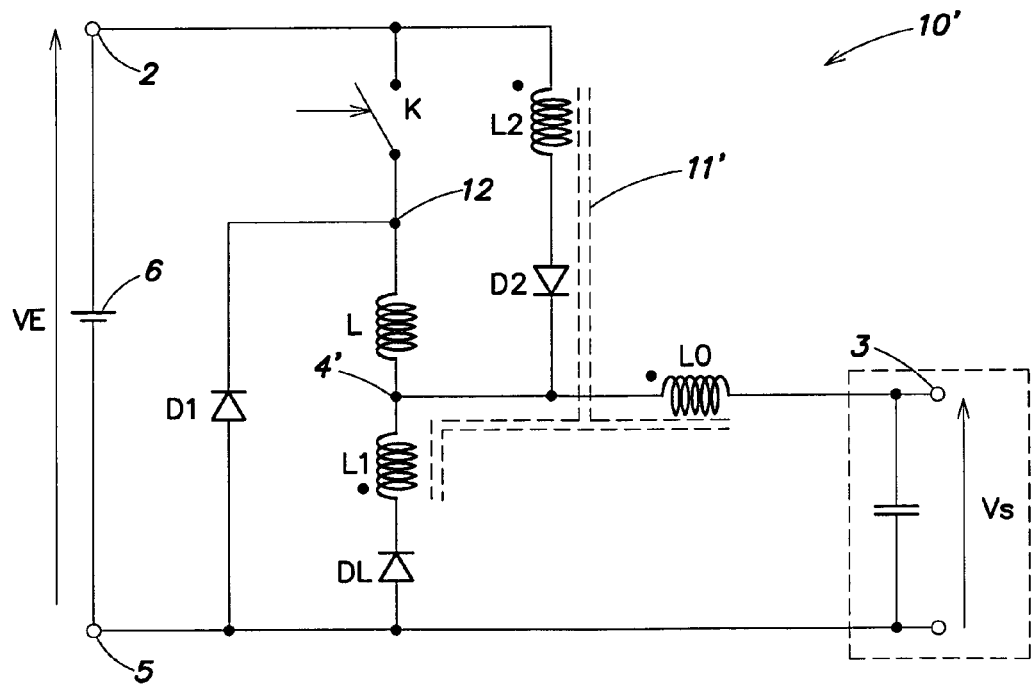
FIG. 8 shows a first embodiment of a switching aid circuit according to the present invention applied to a voltage step-down converter.

FIG. 8 shows another embodiment of a switching aid circuit 10' of the present invention, applied to a voltage step-down converter. The diagram of FIG. 8 should be compared to that of FIG. 2. As compared to the diagram of FIG. 2, inductance L is interposed between point 4' and switch K. Inductance L2 in series with diode D2 is connected between terminal 2 and point 4', the anode of diode D2 being on the side of terminal 2. Winding L1 is connected in series with diode DL between point 4' and ground 5, the anode of diode DL being on the ground side. Finally, diode D1 connects to ground 5 point 12 between switch K and inductance L, the anode of diode D1 being grounded. In the example of FIG. 8, the phase point of winding L0 is connected to point 4'. Accordingly, to fulfill the described functions of magnetic circuit 11', the phase point of winding L1 is on the side of ground terminal 5 and the phase point of winding L2 is on the side of terminal 2.

The operation of the switching aid circuit illustrated in FIG. 8 can be deduced from the discussion of FIGS. 5 to 7.

Of course, the present invention is likely to have various alterations, modifications, and improvements which will readily occur to those skilled in the art. In particular, the sizing of the different windings of the magnetic circuit may be modified, provided to respect a winding L0 having a number of spirals much greater than windings L1 and L2. Preferably, the numbers of spirals of windings L1 and L2 are equal, and the number of spirals of winding L0 is approximately 10 times greater than that of windings N1 and N2.

Further, adapting the present invention to a buck-boost converter is within the abilities of those skilled in the art based on the indications given hereabove.

Further, the present invention applies to any converter assembly, provided that it is a switched-mode converter. In particular, if in the case of a step-down converter (FIG. 8), the switch has been shown with a terminal connected to the most positive voltage, there also exist assemblies in which this switch has a grounded terminal. The present invention also applies to this type of assembly. It is sufficient to invert the respective positions of series associations K–L and L1–DL with respect to point 4', to connect diode D1 by its cathode to terminal 2, and to place series association L2–D2 in parallel on association K–L, the cathode of diode D2 remaining connected to node 4'. Inductance L0 still is connected on the cathode side of free wheel diode DL in series with capacitor C0.

Finally, among the possible alternatives, inductance L0 may be divided into a (main) element of the magnetic circuit in series with a distinct inductance that does not belong to the magnetic circuit. The switching speeds of the diodes may also be adapted although, to obtain the advantages of the present invention, these diodes need not be fast.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not as limiting. The invention is limited only as defined in the following claims and the equivalents thereto.

What is claimed is:

1. A circuit for helping the switching of a switched-mode converter, which includes a first inductive power storage element in series with a free wheel diode and a switch, and a second inductive element for controlling the di/dt value upon turning-on of the switch, characterized in that it includes:
    a magnetic circuit having a main winding formed, at least partially, by the first inductive element;
    discharge means for discharging the second inductive element at the switch turning-off and turning-on; and
    transfer means for transferring the power corresponding to the turning-on to said main winding.

2. The circuit of claim 1, wherein said discharge means include:
    a first discharge circuit including a first switching diode; and
    a second discharge circuit including a first secondary winding of the magnetic circuit.

3. The circuit of claim 2, wherein said transfer means include the first secondary winding of the magnetic circuit and a second switching diode.

4. The circuit of claim 3 wherein the second discharge circuit includes the second inductive element in series with the first secondary winding, the second switching diode, and the switch.

5. The circuit of claim 2 wherein it further includes a second secondary winding of the magnetic circuit in series with the free wheel diode.

6. The circuit of claim 5, wherein the secondary windings have a same number of turns.

7. The circuit of claim 5 wherein the number of turns of the main winding is greater than the numbers of turns of the secondary windings.

8. A switched-mode converter of the type including a first inductive power storage element (L0) in series with a free wheel diode and a storage element of capacitive type, and a second inductive element for controlling a di/dt value upon turning-on of a switch that cuts-off a supply voltage, including the switching aid circuit (10, 10') of claim 1.

9. The converter of claim 8, of voltage step-up type, wherein the first inductive element forming the main winding of the magnetic circuit is in series with the second inductive element and the switch between two terminals of application of the supply voltage.

10. The converter of claim 8, of voltage step-down type, wherein the switch is in series with, among other, the second inductive element and the free wheel diode, between two terminals of application of the supply voltage.

* * * * *